Jan. 30, 1940.　　　D. G. MEIKLE　　　2,188,462

FEEDING MECHANISM

Filed Sept. 7, 1937　　　2 Sheets-Sheet 1

*INVENTOR*
DANIEL G. MEIKLE
BY
*ATTORNEYS*

Jan. 30, 1940.  D. G. MEIKLE  2,188,462
FEEDING MECHANISM
Filed Sept. 7, 1937   2 Sheets-Sheet 2

INVENTOR
DANIEL G. MEIKLE
BY
ATTORNEYS

Patented Jan. 30, 1940

2,188,462

UNITED STATES PATENT OFFICE 2,188,462

FEEDING MECHANISM

Daniel G. Meikle, Ann Arbor, Mich.

Application September 7, 1937, Serial No. 162,826

2 Claims. (Cl. 74—59)

This invention relates to improvements in feeding mechanism of the type particularly applicable to machines equipped with instrumentalities having a traversing movement.

It is one of the principal objects of the present invention to provide a relatively simple, inexpensive feeding mechanism which not only renders it possible to secure an extremely accurate feed, but is also highly flexible in that it offers the possibility of feeding the traversing element at various different rates of speed.

In accordance with this invention, the traversing part associated with the feeding mechanism may be advanced to and withdrawn from its operative position at a relatively fast rate and may be moved, during the working portion of the cycle, at a rate found most efficient for the particular work to be accomplished. In some classes of work, such for example, as drilling or boring, it is desirable to effect the actual boring at a pre-selected speed and to quickly withdraw the drill or boring bar upon completion of the operation. In other types of work, such for example, as tapping, it is essential to withdraw the tap from the work at the same speed employed in the actual tapping operation, but even in this case it is advantageous to quickly move the tool toward and away from the work. My improved feeding mechanism provides for obtaining the foregoing results and, as a consequence, offers the possibility of appreciably increasing the production of machines with which it is associated.

The foregoing, as well as other objects, will be made more apparent as this description proceeds, especially when considered in connection with the accompanying drawings, wherein.

Figure 2:
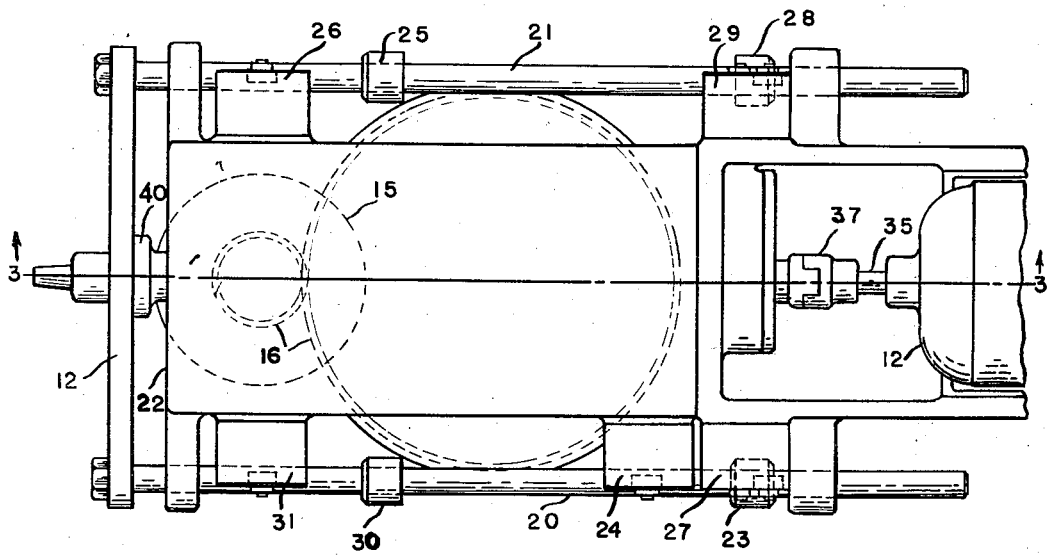
Figure 2 is a plan view of the machine shown in Figure 1.
Figure 1:
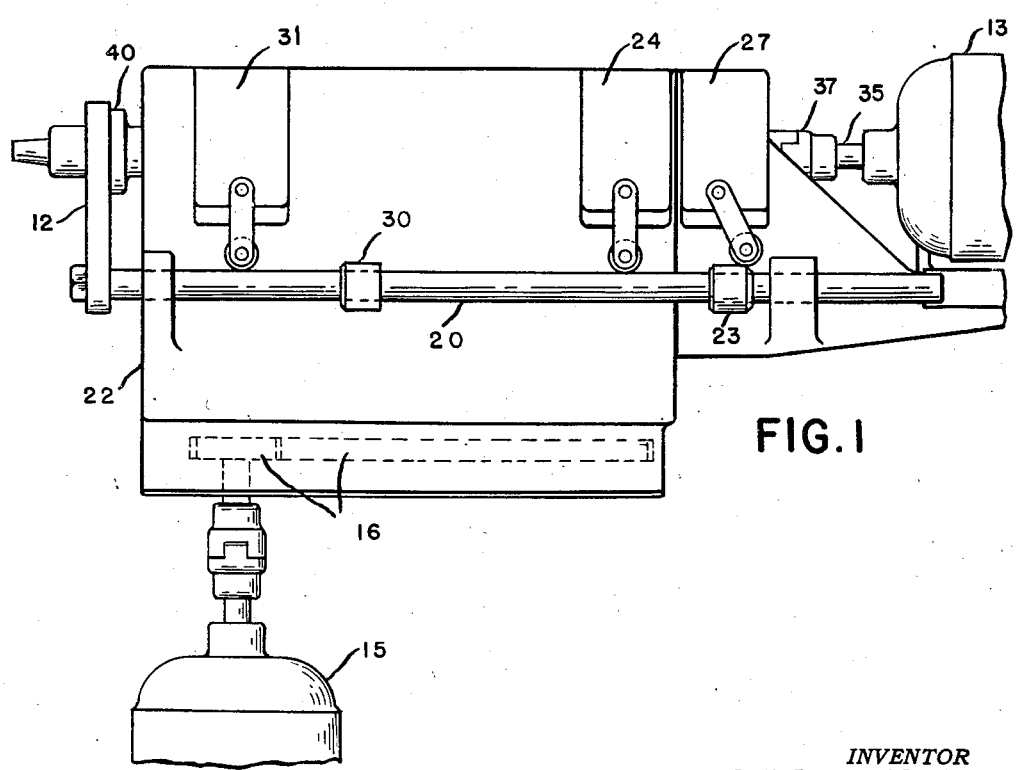
Figure 1 is a side elevational view of a machine equipped with feeding mechanism constructed in accordance with this invention.

The feeding mechanism forming the subject matter of this invention comprises a pair of members 10 and 11 having helical teeth and mounted for rotation relative to each other with the teeth in intermeshing relationship. The teeth on the worm or member 10 extend in a right-hand direction, while the teeth on the worm 11 extend in a left-hand direction. In the illustrative embodiment of the invention, the worm 10 is also mounted for reciprocation in the direction of its axis relative to the worm 11 and is operatively connected to a traversing plate 12 at the forward end thereof. The rear end of the worm 10 is connected to a reversible prime mover or electric motor 13 through the medium of reduction gearing 14, and the worm 11 is operatively connected to a reversible electric motor 15 through the medium of reduction gearing 16. It will, of course, be understood that either or both sets of reduction gearing may be altered by interchanging the gears to effect rotation of the two worms at either the same rate of speed, or at different rates of speed depending upon the nature of the feed required to form the particular work.

Assuming that during one complete cycle of traversing movement of the tool carrying plate 12, it is desired to, first, rapidly advance the plate to a position wherein the tool is in operative relation with the work, second, reduce the rate of advancement to the speed found most suitable for performing the working operation and, third, quickly withdraw the plate 12 to its initial position upon completion of the working operation. In order to accomplish the above results, the motor 15 is placed in operation and the right-hand worm 11 is rotated through the reduction gearing 16 in a clockwise direction as viewed from the front of the machine. The motor 13 is left idle and, as a result, the left-hand worm 10 is rapidly advanced in an axial direction toward the forward end of the machine. Inasmuch as the plate 12 is carried by the worm 10, it follows that this plate will also be rapidly advanced in a corresponding direction toward the work (not shown). At a predetermined point in the travel of the plate 12 toward the work and before the tool (not shown) carried by the plate engages the work, the motor 13 is placed in operation and the worm 10 is rotated through the reduction gearing 14 in a direction opposite the direction of rotation of the worm 11. As a result, the rate of advancement of the plate 12 toward the work is substantially reduced depending upon the lead of the helical teeth of the worms and upon the relative speeds of rotation of the worms. These variables are pre-selected in accordance with the work to be performed so that the resultant rate of feed during the operating cycle is most efficient for the particular work. Upon completion of the travel of the plate 12 required to complete the working stroke of the tool, the motor 15 is reversed and the worm 11 is rotated in the same direction as the worm 10 is revolved. As a result, the plate 12 (and the associated tool, not shown) is rapidly returned to its initial position shown in Figure 3 of the drawings. In other words, when the motor 15 is reversed, the two worms are rotating in a counter-clockwise direction, as viewed from the front of the machine and, as a consequence, the return movement of the plate 12 is effected at a much more rapid rate than the initial movement of the plate 12 toward the work, since in the latter case only the worm 11 is rotated.

In some classes of work, such for example, as tapping a bore or hole in a work blank, it is necessary to withdraw a tap from the work at the same rate of speed as the tap is fed into the work and this may be readily accomplished with the feeding mechanism forming the subject matter of this invention by reversing both of the worms at the end of the tapping operation. However, as soon as the tap is removed from the work, the motor 13 may be stopped and since the worm 11 is rotating in a counter-clockwise direction, it follows that the tap carried by the plate 12 will be moved to its initial starting position at a relatively faster rate of speed.

In Figure 2 of the drawings, I have shown semi-diagrammatically one type of mechanism that may be employed to secure the foregoing results. In detail, a pair of guide rods 20 and 21 are secured at their forward ends to the traversing plate 12 and are slidably mounted in the machine frame 22 for movement as a unit with the plate 12. As a consequence, when the motor 15 is placed in operation, the guide rods are moved forwardly by the worm 10 at the rapid rate of advance previously referred to. As soon as the tool carried by the plate 12 has been advanced the extent required to engage the same with the work, an adjustable collar 23 on the rod 20 operates a switch 24 to start the motor 13. As stated above, the motor 13 rotates the worm 10 in a direction opposite the direction of rotation of the worm 11 and a relatively slow feed of the plate 12 in a forward direction is effected. Upon completion of the operation of the tool on the work piece, an adjustable collar 25 on the rod 21 operates a switch 26 to reverse the motor 15 and rotate the worm 11 in the same direction as the worm 10. As a result, the plate is returned to its initial position at a rapid rate which is desirable in that it provides for increasing the production of the machine. As a matter of fact, the return movement of the plate is effected at a rate of speed considerably faster than the initial advancing movement of the plate 12 since both the right and left-hand worms are rotating in the same direction during the retracting movement. When the plate 12 assumes its initial starting position, shown in Figure 3, the adjustable collar 23 on the rod 20 operates a switch 27 to stop the motor 13 and a similar adjustable collar 28 engages a switch 29 to stop the motor 15. It has previously been stated that in some cases, it is necessary to withdraw the tool from the work at the same speed as is employed in feeding the tool into the work. In cases of this character, the motor 13 is reversed at the same time that the motor 15 is reversed by the switch 26 or, in other words, both motors are reversed at the end of the effective forward travel of the plate 12. For accomplishing this result, the rod 20 is provided with an adjustable collar 30 for engagement with the reversing switch 31 arranged in the circuit to the motor 13. It will, of course, be understood that the collar 30 is either dispensed with, or arranged in such a position that it will not operate the reversing switch 31 in cases where it is desired to withdraw the tool from the work at a rapid rate of speed. Attention may also be called to the fact that in the event it is desired to rapidly move the tool away from the work after the same has been withdrawn from the work, the collar 23 is adjusted on the rod 20 to stop the motor 13 as soon as the tool is removed from the work. As a consequence, the worm 10 and plate 12 will be returned to their initial starting positions at a relatively rapid rate of speed by the worm 11.

Figure 3:
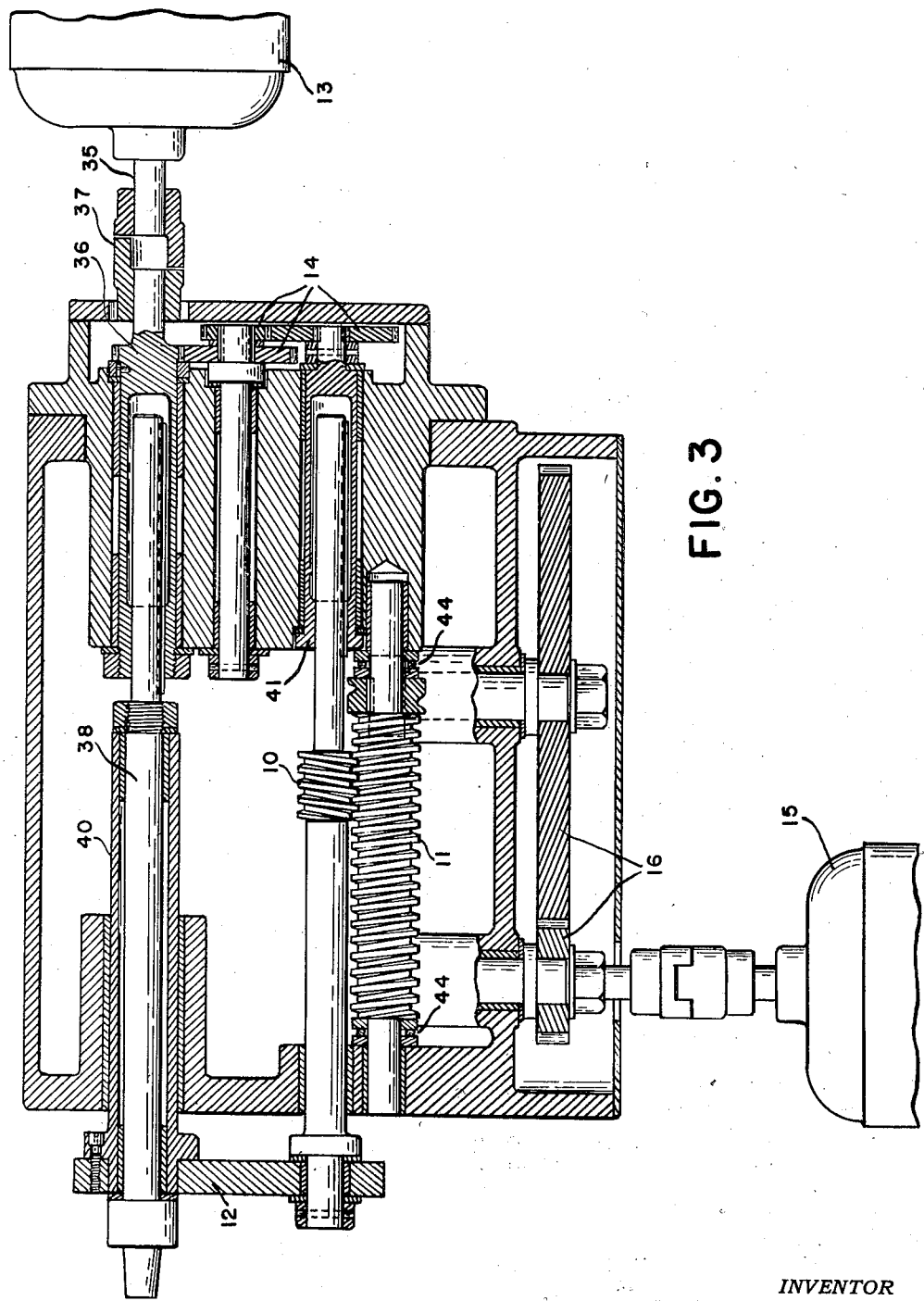
Figure 3 is a sectional view taken substantially on the plane indicated by the line 3—3 of Figure 2.

One specific embodiment of the invention is illustrated in Figure 3 wherein it will be noted that the drive shaft 35 of the motor 13 is operatively connected to a hollow shaft 36 through the medium of a coupling 37. A suitable spindle 38 is positioned in alignment with the shaft 36 and the rear end of the spindle is splined in the hollow portion of the shaft 36 in order to permit rotation of the spindle with the shaft 36 and at the same time afford axial movement of the spindle relative to the shaft 36. The spindle is supported in the machine frame 22 by means of a suitable quill 40 movable axially with the spindle and secured at its forward end to the plate 12. The spindle extends forwardly through the plate and a drill chuck or other suitable tool (not shown) is attached thereto. With the above construction, it will be noted that the plate 12, spindle 38, and quill 40 are moved axially of the drive shaft 36 and that during this movement of the aforesaid parts, the tool (not shown) may be rotated by the spindle. Referring again to Figure 3, it will be noted that the forward end of the worm 10 is secured to the plate 12 for reciprocating the latter and associated parts. The rear end of the worm 10 is splined in a hollow shaft 41 which, in turn, is operatively connected to the motor 13 through the medium of the reduction gearing 14. The arrangement is such as to permit reciprocation of the worm 10 in the direction of its axis and at the same time provide for rotating the worm by the shaft 41. The worm 11 is merely journalled in the machine frame and is supported against axial movement by means of the thrust bearings 44.

It will, of course, be understood that the foregoing construction is merely shown herein for the purpose of illustrating my improved feeding mechanism and the latter should in no way be considered as limited to this particular application. As evidenced from the foregoing description of the feeding mechanism, the latter is highly flexible in its utility and, due to this fact, has many and diversified uses.

What I claim as my invention is:

1. In feeding mechanism, a traversing part, a member having helical teeth operatively connected to the traversing part for movement therewith, a second member having helical teeth extending in the opposite direction from the helical teeth on the first member and meshing with the teeth on said first member, means for initially rotating the second member relative to the first member in one direction to effect movement of the traversing part at a relatively fast rate, means for subsequently effecting rotation of the first member in the opposite direction to reduce the rate of advancement of the traversing part, and means operating after a predetermined length of travel of the traversing part to reverse the direction of rotation of said second member and thereby effect return movement of the traversing part at a relatively rapid rate of speed.

2. In feeding mechanism, a traversing part, a member having helical teeth operatively connected to the traversing part for movement therewith, a second member having helical teeth extending in the opposite direction from the helical teeth on the first member and meshing with the teeth on said first member, means for rotating the second member relative to the first member in one direction to effect movement of the traversing part, means operating after a predetermined length of travel of the traversing part to rotate the first member in the opposite direction and thereby decrease the speed of advancement of the traversing part, and means for subsequently reversing both of said members to effect return movement of the traversing part.

DANIEL G. MEIKLE.